US005773949A

United States Patent [19]
Nagatomi et al.

[11] Patent Number: 5,773,949
[45] Date of Patent: Jun. 30, 1998

[54] CUTTER FRACTURE DETECTING SYSTEM

[75] Inventors: Takashi Nagatomi; Miwako Sakaguchi, both of Minamitsuru-gun, Japan

[73] Assignee: Fanuc, Ltd., Yamanashi, Japan

[21] Appl. No.: 682,729

[22] PCT Filed: Oct. 19, 1995

[86] PCT No.: PCT/JP95/02154

§ 371 Date: Jul. 26, 1996

§ 102(e) Date: Jul. 26, 1996

[87] PCT Pub. No.: WO96/19316

PCT Pub. Date: Jun. 27, 1996

[30] Foreign Application Priority Data

Dec. 21, 1994 [JP] Japan .................................. 6-318036

[51] Int. Cl.$^6$ ...................................................... B25J 9/18
[52] U.S. Cl. ..................... 318/568.11; 318/432; 318/434; 318/568.11
[58] Field of Search ................................... 318/432, 434, 318/568.11; 361/23, 29, 30, 31

[56] References Cited

U.S. PATENT DOCUMENTS 5,568,028 10/1996 Uchiyama et al. ..................... 318/566
5,570,256 10/1996 Schoen et al. ............................. 361/31
5,587,915 12/1996 Nagatomi et al. .................. 364/474.19

FOREIGN PATENT DOCUMENTS

| 0 666 138 | 8/1995 | European Pat. Off. . |
| 6-170697 | 6/1994 | Japan . |
| 7-51991 | 2/1995 | Japan . |

Primary Examiner—William M. Shoop, Jr.
Assistant Examiner—Kim Lockett
Attorney, Agent, or Firm—Staas & Halsey

[57] ABSTRACT

A cutter fracture detecting system is capable of detecting a fracture of a cutter highly accurately which may occur even when no substantial loads are imposed on a rotating axis and a cutter feed axis of a machine tool. A rotating axis disturbant load torque estimating unit (1) and a moving axis disturbant load torque estimating unit (2) monitor disturbant load torques on a spindle and an axis with respect to which a workpiece and a cutter move relatively to each other, and still axis disturbant load torque estimating units (3, 4) also monitor disturbant load torques on axes with respect to which the workpiece and the cutter do not move relatively to each other. A comparing unit (5) determines that the cutter is fractured based on the disturbant load torques estimated by the disturbant load torque estimating units. When a cutter fracture is detected, the machine tool is stopped by a machine shutdown command unit (6).

9 Claims, 11 Drawing Sheets

| TYPE OF AXIS | ROTATING AXIS | STILL AXIS | MOVING AXIS |
|---|---|---|---|
| DETECTED EXAMPLE 1 | × | ○ | × |
| DETECTED EXAMPLE 2 | ○ | ○ | × |
| DETECTED EXAMPLE 3 | × | ○ | ○ |
| DETECTED EXAMPLE 4 | ○ | ○ | ○ |

FIG. 8

| NAME OF AXIS | SPINDLE | X-AXIS | Y-AXIS | Z-AXIS |
|---|---|---|---|---|
| MACHINED EXAMPLE 1 | ROTATING AXIS | STILL AXIS | STILL AXIS | MOVING AXIS |
| MACHINED EXAMPLE 2 | ROTATING AXIS | MOVING AXIS | STILL AXIS | STILL AXIS |
| MACHINED EXAMPLE 3 | ROTATING AXIS | STILL AXIS | MOVING AXIS | STILL AXIS |

FIG. 9

| NAME OF AXIS | SPINDLE | X-AXIS | Y-AXIS | Z-AXIS |
|---|---|---|---|---|
| MACHINED EXAMPLE 4 | ROTATING AXIS | STILL AXIS | STILL AXIS | MOVING AXIS |
| MACHINED EXAMPLE 5 | ROTATING AXIS | MOVING AXIS | STILL AXIS | STILL AXIS |
| MACHINED EXAMPLE 6 | ROTATING AXIS | STILL AXIS | MOVING AXIS | STILL AXIS |
| MACHINED EXAMPLE 7 | ROTATING AXIS | MOVING AXIS | STILL AXIS | MOVING AXIS |
| MACHINED EXAMPLE 8 | ROTATING AXIS | MOVING AXIS | MOVING AXIS | STILL AXIS |
| MACHINED EXAMPLE 9 | ROTATING AXIS | STILL AXIS | MOVING AXIS | MOVING AXIS |

FIG. 10

| NAME OF AXIS | SPINDLE | X-AXIS | Z-AXIS |
|---|---|---|---|
| MACHINED EXAMPLE 10 | ROTATING AXIS | STILL AXIS | MOVING AXIS |
| MACHINED EXAMPLE 11 | ROTATING AXIS | MOVING AXIS | STILL AXIS |

CUTTER FRACTURE DETECTING SYSTEM

TECHNICAL FIELD

The present invention relates to a cutter fracture detecting system for detecting a fracture i.e., any debilitating damage or breakage, of a cutter used in a numerically controlled machine tool in which the cutter and a workpiece are moved relatively to each other.

BACKGROUND ART

Some conventional numerically controlled machine tools have a sensor mounted on a table or a cutter holder for detecting a fracture of a cutter which may be brought about by an abnormal load imposed on the cutter when the cutter cuts a workpiece. Each time a workpiece is to be machined by a cutter, the cutter is actuated to move to the position of the sensor, and if the sensor fails to detect the cutter, then the cutter is judged as being broken. The use of the sensor is, however, disadvantageous in that it is difficult to install the sensor in position due to space limitations around the table, and the need for a signal processing controller associated with the sensor in addition to a numerical control apparatus results in a system which is structurally complex and highly costly.

Another process of detecting a cutter fracture is based on the assumption that a cutter fracture is caused by an excessive load applied to a location where a component operates, e.g., a spindle rotates or a cutter moves along an axis. A fracture of the cutter is detected based on monitored loads on the spindle and a Z-axis. Specifically, a disturbant load torque is estimated from the torque of a motor which is required to rotate the spindle, and another disturbant load torque is estimated from the torque of a motor which is required to feed the cutter. A fracture of the cutter is detected from the estimated disturbant load torques. For details, see Japanese patent application No. 5-138293.

According to the above process of detecting a cutter fracture by monitoring loads on the spindle and the Z-axis, when the estimated disturbant load torques exceed a predetermined reference torque, the cutter is judged as being worn, and when the estimated disturbant load torques fall short of another predetermined reference torque or exceeds still another predetermined reference torque, the cutter is judged as being fractured. In most cases, a cutter fracture can be detected by detecting an excessive load on the operating spindle or axis.

However, an analysis of actual cutter fractures has indicated that the cutters are broken under various different conditions, and some of the cutters are fractured under loads on the operating spindle or axis which are sufficiently lower than a maximum load that is applied in the normal cutting process, and hence they are fractured even though enough wear has not been developed thereon. Consequently, it has been found out that cutter fractures may not necessarily accurately be detected simply by monitoring loads on the operating spindle or axis.

DISCLOSURE OF THE INVENTION

The present invention has been made in view of the above problems. It is an object of the present invention to provide a cutter fracture detecting system capable of detecting a fracture of a cutter with high accuracy.

To achieve the above object, there is provided in accordance with the present invention a cutter fracture detecting system for detecting a fracture of a cutter in a numerically controlled machine tool in which a workpiece and the cutter move relatively to each other, comprising still axis disturbant load torque estimating means for estimating a disturbant load torque acting on one or a plurality of axes with respect to which the workpiece and the cutter do not move relatively to each other, comparing means for comparing the disturbant load torque estimated by the still axis disturbant load torque estimating means with a predetermined reference torque, and machine shutdown command means for outputting a command signal to stop the numerically controlled machine tool depending on a result of decision by the comparing means.

With the above arrangement, a disturbant load torque on one or the plurality of axes with respect to which the workpiece and the cutter do not move relatively to each other, e.g., disturbant load torques on X- and Y-axes, are monitored. Based on the monitored disturbant load torques, it is possible to detect information upon a cutter fracture, which does not appear on an operating axis, for more accurate detection of the cutter fracture.

BEST MODE FOR CARRYING OUT THE INVENTION

An embodiment of the present invention will hereinafter be described with reference to the drawings.

Figure 1:
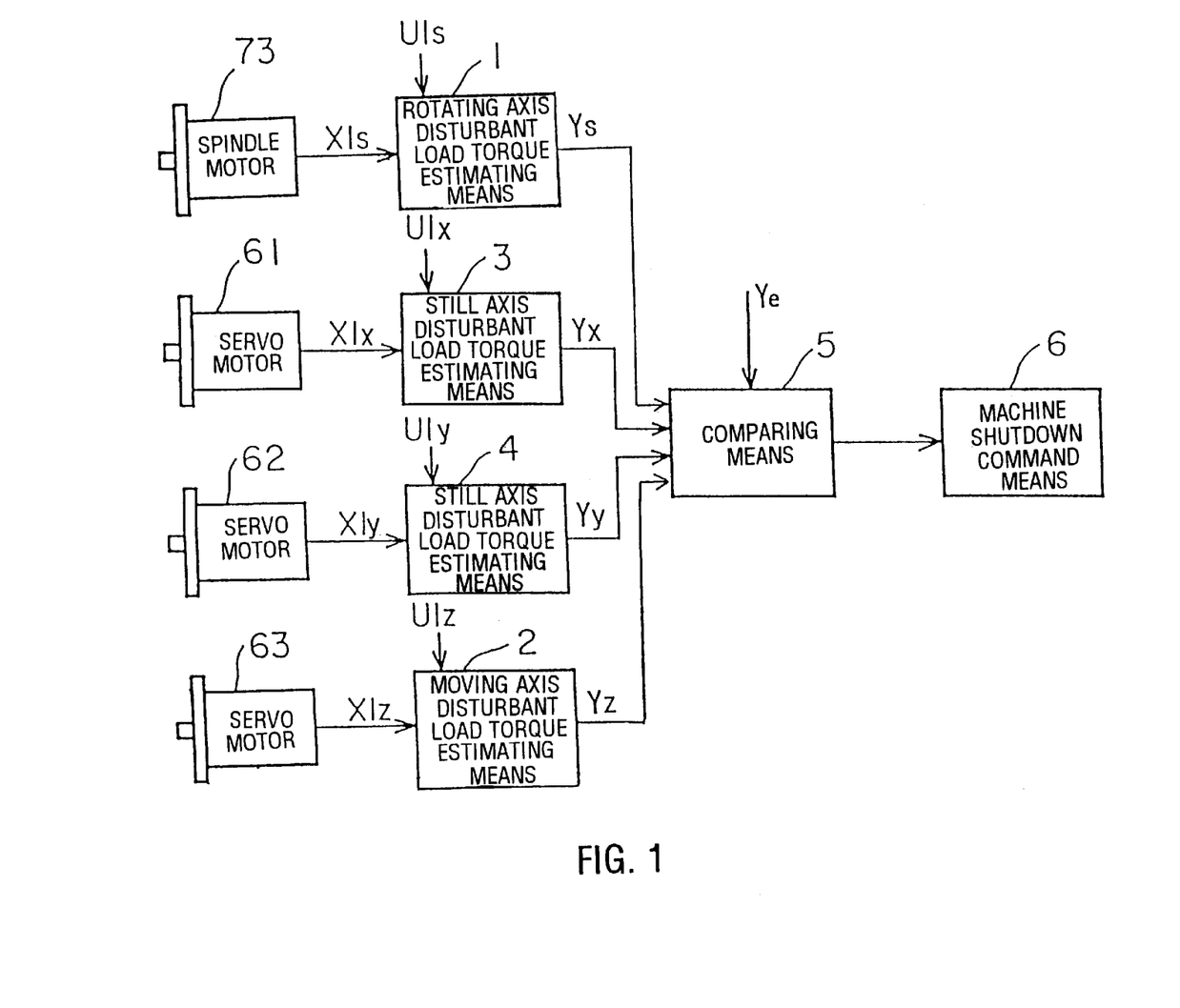
FIG. 1 is a block diagram of a cutter fracture detecting system according to the present invention.

FIG. 1 is a block diagram showing the principles of a cutter fracture detecting system according to the present invention. As shown in FIG. 1, a rotating axis disturbant load torque estimating means 1 estimates a disturbant load torque Ys imposed on a spindle motor 73 for rotating a spindle, based on a velocity signal X1s of the spindle motor 73 and a torque command value U1s for the spindle motor 73. A moving axis disturbant load torque estimating means 2 estimates a disturbant load torque Yz imposed on a servomotor 63 for feeding a cutter along a Z-axis, based on a velocity signal X1z of the servomotor 63 and a torque command value U1z for the servomotor 63. A still axis disturbant load torque estimating means 3 estimates a disturbant load torque Yx imposed on a servomotor 61 for feeding the cutter along an X-axis, based on a velocity signal X1x of the servomotor 61 and a torque command value U1x for the servomotor 61. A still axis disturbant load torque estimating means 4 estimates a disturbant load torque Yy imposed on a servomotor 62 for feeding the cutter along a Y-axis, based on a velocity signal X1y of the servomotor 62 and a torque command value U1y for the servomotor 62.

A comparing means 5 compares the estimated disturbant load torques Ys, Yz, Yx, Yy which are supplied thereto with a predetermined reference torque Ye. If a combined disturbant load torque Y, which is a combination of the estimated disturbant load torques Ys, Yz, Yx, Yy, or the individual estimated disturbant load torques Ys, Yz, Yx, Yy are greater than the reference torque Ye, then the comparing means 5 determines that the cutter is fractured, and outputs a signal indicative to the cutter fracture to a machine shutdown command means 6. In response to the signal indicative to the cutter fracture, the machine shutdown command means 6 outputs a machine shutdown command signal to a numerical control apparatus.

The comparing means 5 decides a cutter fracture based on the estimated disturbant load torques Ys, Yz, Yx, Yy from the disturbant load torque estimating means 1~4 and the predetermined reference torque Ye. Various processes of deciding a cutter fracture based on the estimated disturbant load torques Ys, Yz, Yx, Yy and the predetermined reference torque Ye will be described below.

According to a first process, a combined torque produced by multiplying all the estimated disturbant load torques Ys, Yz, Yx, Yy by suitable respective coefficients and adding the products is compared with the reference torque Ye. The combined torque, denoted by Y, is expressed as follow:

$$Y = \alpha \cdot Yz + \beta \cdot Ys + \gamma \cdot Yx + \delta \cdot Yy \quad (1)$$

or $$Y = \alpha \cdot Yz + \beta \cdot Ys + \eta (\gamma \cdot Yx^2 + \delta \cdot Yy^2)^{1/2} \quad (2)$$

where $\alpha$, $\beta$, $\gamma$, $\delta$, and $\eta$ are coefficients that are determined on the basis of experimental data. The reference torque Ye is also determined on the basis of experimental data. If the combined torque Y is greater than the reference torque Ye, then the comparing means 5 decides that the cutter is fractured.

According to a second process, the individual estimated disturbant load torques Ys, Yx, Yy, Yz are compared with corresponding individual reference torques $Ye_1$~$Ye_4$. If estimated disturbant load torque Ys is smaller than the reference torque $Ye_1$, or any one of the estimated disturbant load torques Yx, Yy, Yz is greater than a corresponding one of the reference torques $Ye_2$~$Ye_4$, then the comparing means 5 decides that the cutter is fractured.

According to a third process, some of the estimated disturbant load torques Ys, Yx, Yy, Yz are compared with each other and compared with reference torque, and the remaining estimated disturbant load torques are either combined with each other and compared with reference torque or individually compared with respective reference torques.

For example, the estimated disturbant load torques Ys, Yz are compared into a combined torque Y1, and the estimated disturbant load torques Yx, Yy are compared into a combined torque Y2. The combined torques Y1, Y2 are compared with respective reference torques $Ye_1$, $Ye_2$. If either one of the combined torques Y1, Y2 is greater than the corresponding reference torque, then the comparing means 5 decides that the cutter is fractured.

Alternatively, the estimated disturbant load torque Ys is compared with a corresponding reference torque, and a combined torque produced by combining the estimated disturbant load torques Yx, Yy, Yz is compared with another reference torque. If the combined torque is greater than the reference torque even though the estimated disturbant load torque Ys is smaller than the corresponding reference torque, then the comparing means 5 decides that the cutter is fractured.

Figure 2:
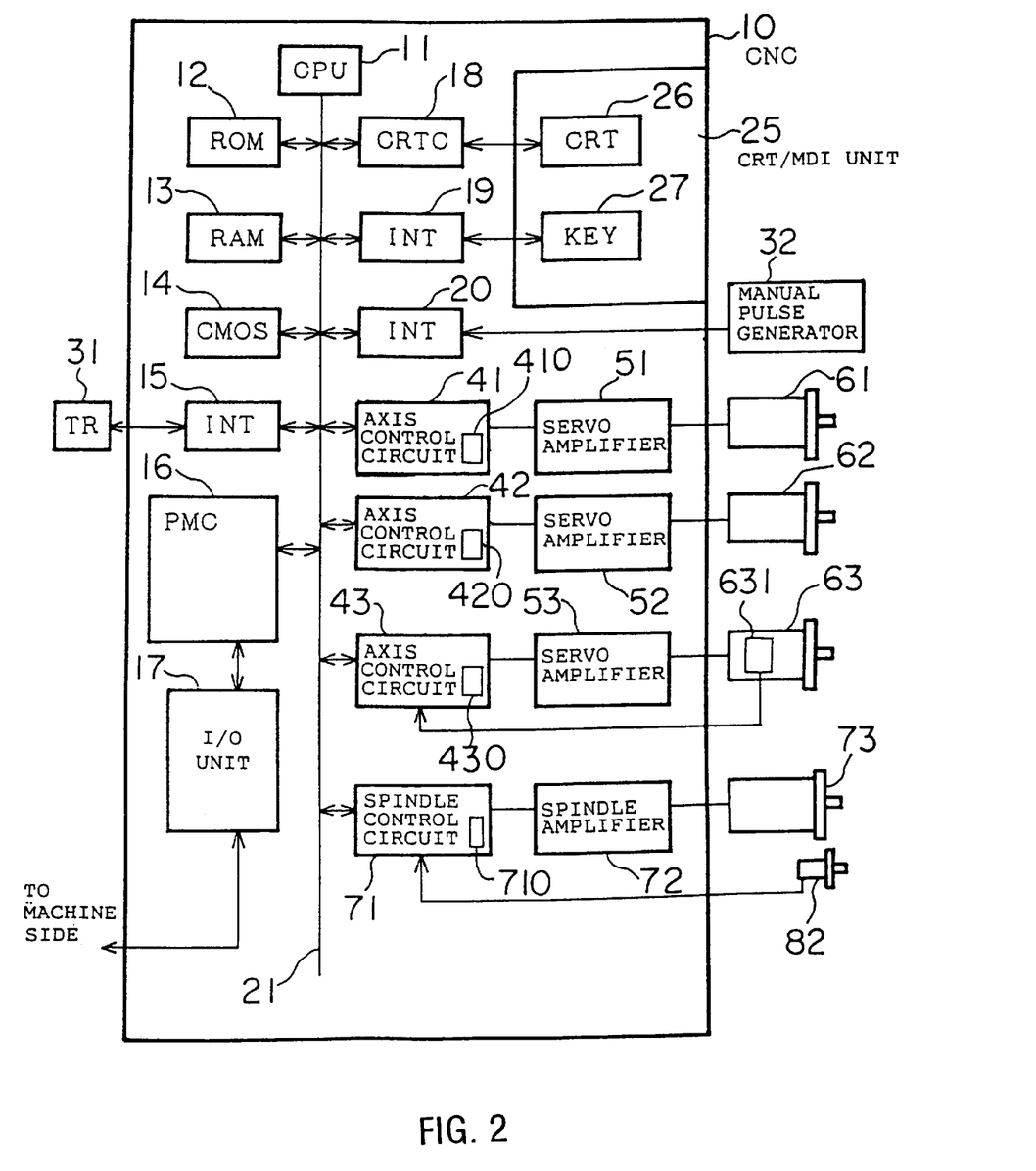
FIG. 2 is a block diagram of a hardware arrangement of a computerized numerical control apparatus for implementing the cutter fracture detecting system according to the present invention.

FIG. 2 shows in block form a hardware arrangement of a computerized numerical control apparatus for implementing the cutter fracture detecting system according to the present invention. As shown in FIG. 2, the computerized numerical control apparatus is indicated by the reference numeral 10. The computerized numerical control apparatus 10 has a central processor 11 for controlling the computerized numerical control apparatus 10 in its entirety. The processor 11 reads a system program stored in a read-only memory (ROM) 12 through a bus 21, and executes control over the computerized numerical control apparatus 10 in its entirety according to the system program. A random-access memory (RAM) 13 stores temporary calculated data and display data. The random-access memory 13 comprises a DRAM. A nonvolatile memory (CMOS) 14 stores a machining program and various parameters. The nonvolatile memory 14 is backed up by a battery (not shown), so that the stored data will be retained in the event of a power failure of the computerized numerical control apparatus 10.

An interface (INT) 15 serves to interface the computerized numerical control apparatus 10 with an external device 31 which may be a tape reader, a tape puncher, or a tape reader/puncher. A machining program can be read from the external device 31 which comprises a tape reader through the interface 15, and a machining program edited in the computerized numerical control apparatus 10 can be outputted to the external device 31 which comprises a tape puncher through the interface 15.

A programmable machine controller (PMC) 16 is provided in the computerized numerical control apparatus 10 for controlling a machine tool according to a sequence program which is generated in ladder form. Specifically, the programmable machine controller 16 converts an M function, an S function, and a T function which are commanded by the machining program, into signals required by the machine tool according to the sequence program, and outputs the converted signals from an input/output (I/O) unit 17. The outputted signals are supplied to energize electromagnets on the machine tool and operates hydraulic valves, pneumatic valves, and electric actuators. The programmable machine controller 16 also processes signals from limit switches on the machine tool and switches on a machine control console, and delivers the processed signals to the processor 11.

A graphic control circuit (CRTC) 18 converts digital data including the present positions of the axes, alarms, parameters, and image data into image signals, which are sent to a display device (CRT) 26 of a CRT/MDI (Cathode-Ray Tube/Manual Data Input) unit 25, and displayed on the display device 26. An interface (INT) 19 receives data from a keyboard (KEY) 27 in the CRT/MDI unit 25, and delivers the received data to the processor 11.

An interface (INT) 20 is connected to a manual pulse generator 32 for receiving pulses generated by the manual pulse generator 32. The manual pulse generator 32 is mounted on the machine control console for manually positioning mechanical operable parts accurately.

Axis control circuits 41~43 receive motion commands for the respective axes from the processor 11, and outputs motion commands for the respective axes to servoamplifiers 51~53, respectively. In response to the motion commands, the servoamplifiers 51~53 energize respective servomotors 61~63 for the respective axes. The servomotor 63 which controls the feeding of the cutter along a Z-axis has a built-in pulse coder 631 for positional detection. A positional signal from the pulse coder 631 is fed as a pulse train back to the axis control circuit 43. Although not shown, the servomotors 61, 62 which control the feeding of the cutter along X- and Y-axes, respectively, have respective built-in pulse coders for positional detection. These pulse coders also feed positional signals as pulse trains back to the axis control circuits 41, 42. Linear scales may be used as such position detectors. The pulse trains may be converted into a velocity signal to generate velocity signals X1x, X1y, X1z by way of F/V (frequency-to-velocity) conversion.

The axis control circuits 41, 42, 43 have respective processors (not shown) for executing software processing to perform functions including respective observers 410, 420, 430. The observers 410, 420, 430 estimate disturbant load torques Yx, Yy, Yz acting on the servomotors 61, 62, 63 in response to the velocity signals X1x, X1y, X1z, as described in detail later on.

A spindle control circuit 71 receives a spindle rotation command and a spindle orientation command, and outputs a spindle velocity signal to a spindle amplifier 72. In response to the spindle velocity signal, the spindle amplifier 72 energizes a spindle motor 73 to rotate at a rotational velocity commanded by the spindle rotation command. The spindle amplifier 72 also positions the spindle at a position indicated by the spindle orientation command.

A position coder 82 is coupled to the spindle motor 73 either through gears or a belt or directly. The position coder 82 rotates in synchronism with the spindle motor 73 and outputs feedback pulses which are fed back to the spindle control circuit 71. The feedback pulses can be converted into a velocity signal X1s by way of F/V (frequency-to-velocity) conversion.

The spindle control circuit 71 has a processor (not shown) for executing software processing to perform functions including an observer 710. The observer 710 estimates a disturbant load torque Ys acting on the spindle motor 73 in response to the velocity signal X1s, etc. The estimated disturbant load torque Ys and also the estimated disturbant load torques Yx, Yy, Yz sent to the programmable machine controller 16.

The programmable machine controller 16 carries out software processing in response to the estimated disturbant load torques Yx, Yy, Yz, Ys. For example, the programmable machine controller 16 combines the estimated disturbant load torques Yx, Yy, Yz, Ys into a combined torque Y, compares the combined torque Y with a reference torque Ye for detecting an abnormal torque, and instructs the processor 11 to shut off the machine tool when an abnormal torque is detected.

Figure 3:
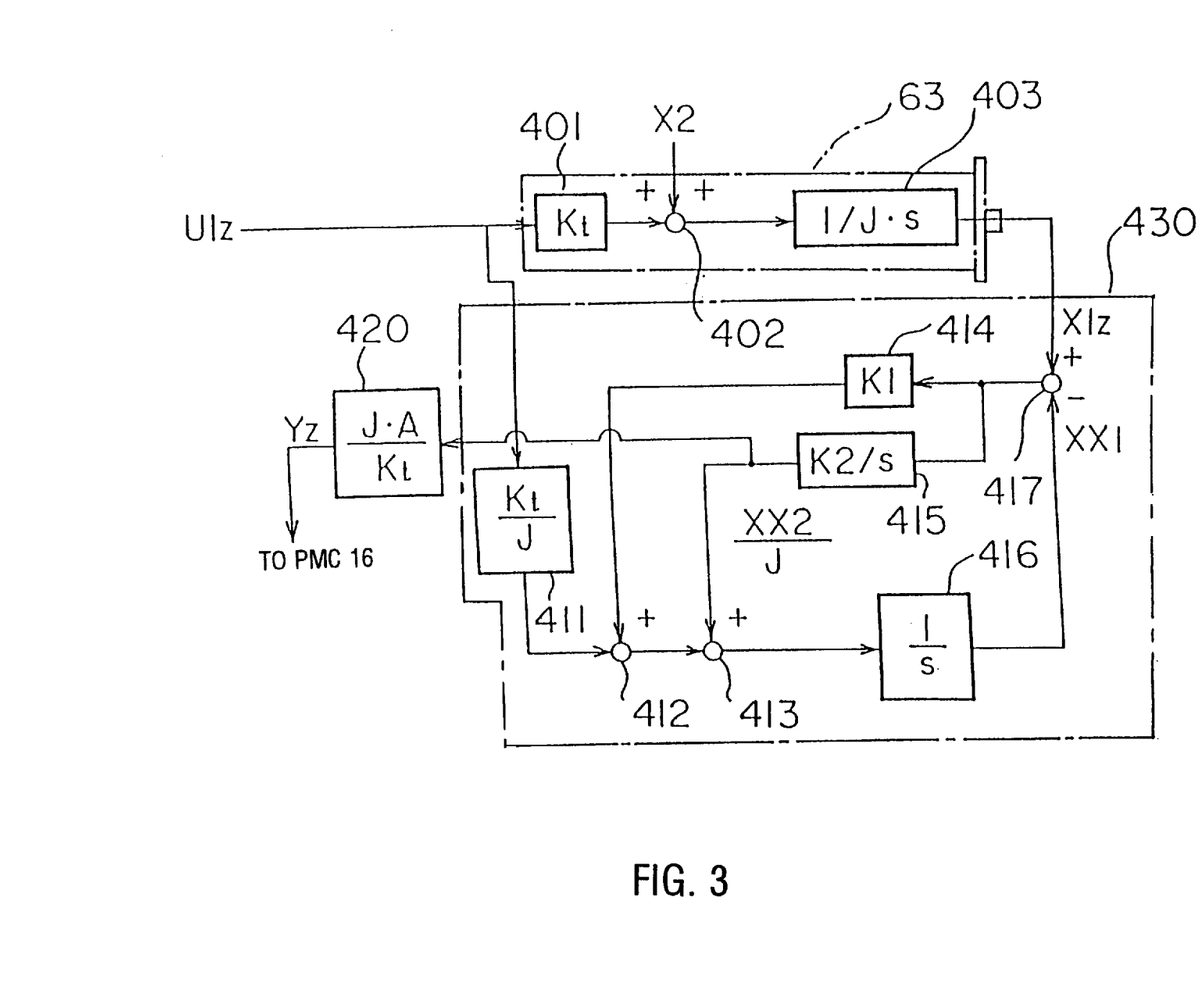
FIG. 3 is a block diagram of an observer according to the present invention.

FIG. 3 shows in block form an observer according to the present invention. The processing shown in the block diagram of FIG. 3 is executed by the observers 410, 420, 430 of the axis control circuits 41, 42, 43 and the observer 710 of the spindle control circuit 71. Since these observers 410, 420, 430, 710 are identical in arrangement with each other, only the observer 430 will be described below, and the other observes 410, 420, 710 will not be described.

In FIG. 3, a current U1z is a torque command value which is outputted to the servomotor 63 in response to a motion command from the processor 11. The current U1z is applied to an element 401 to energize the servomotor 63. To an output torque of the servomotor 63, there is added a disturbant load torque X2 by an arithmetic element 402. An output signal from the arithmetic element 402 is converted into a velocity signal X1z by an element 403. In the servomotor 63, Kt and J represents the torque constant and inertia, respectively, of the servomotor 63.

The current U1z is also applied to the observer 430. The observer 430 determines an estimated velocity XX1 from the current U1z and the velocity X1z of the servomotor 63 for controlling the velocity of the servomotor 63. Velocity control of the servomotor 63 is omitted here, and only processing operations for estimating a disturbant load torque will be described below. The current U1z is multiplied by (Kt/J) by an element 411, and then outputted to an arithmetic element 412. To an output signal from the element 411, there is added a feedback signal from a proportional element 414 by an arithmetic element 412, and then there is added a feedback signal from an integral element 415 by an arithmetic element 413. Output signals from the arithmetic elements 412, 413 are expressed in a unit of acceleration. The output signal from the arithmetic element 413 is applied to an integral element 416, which outputs an estimated velocity XX1 for the servomotor 63.

The difference between the estimated velocity XX1 and the actual velocity X1z is determined by an arithmetic element 417, and fed back to the proportional element 414 and the integral element 415. The proportional element 414 has a proportionality constant K1 which is expressed in a unit of $\sec^{-1}$. The integral element 415 has an integration constant K2 which is expressed in a unit of $\sec^{-2}$.

The output signal of the integral element 415 is representative of an estimated acceleration (XX2/J) which is produced by dividing an estimated disturbant torque load XX2 by J. The estimated acceleration (XX2/J) is then converted into a current value by a proportional element 420. For torque representation, the current value is expressed as an estimated disturbant load torque Yz. In the proportional element 420, J represents the inertia of the servomotor 63 as with J in the element 403, Kt is the same as the torque constant of the element 401, and A represents a coefficient which is of a numerical value of 1 or smaller and is used to correct the estimated acceleration (XX2/J). In this manner, the estimated disturbant load torque Yz of the servomotor 63 can be estimated using the observer 430, and is sent to the programmable machine controller 16.

Estimated disturbant load torques Yx, Yy of the other servomotors 61, 62 are determined in the same manner as described above.

An estimated disturbant load torque Ys of the spindle motor 73 is also determining using the observer 710. In this case, the observer 710 determines an estimated disturbant load torque Ys from a current U1s and the velocity signal X1s of the spindle motor 73. The current U1s represents a torque command value outputted to the spindle motor 73 in response to a spindle rotation command from the processor 11.

The estimated disturbant load torques Yx, Yy, Yz, Ys are sent to the programmable machine controller 16. As described above, the programmable machine controller 16 carries out the process of detecting a cutter fracture using the estimated disturbant load torques Yx, Yy, Yz, Ys, and instructs the processor 11 to shut off the machine tool if it decides that the cutter is broken.

The process of detecting a cutter fracture is based on the estimated disturbant load torques Ys, Yx, Yy, Yz for the spindle and various moving axes. These estimated disturbant load torques Ys, Yx, Yy, Yz are also representative of a condition that leads to a cutter fracture, i.e., a condition of cutter wear. Therefore, it is possible to decelerate or stop the axes or change cutters depending on the magnitude of the estimated disturbant load torques Ys, Yx, Yy, Yz. An example of a processing sequence of the programmable machine controller 16 will be described below with reference to FIGS. 4 and 5.

Figure 4:
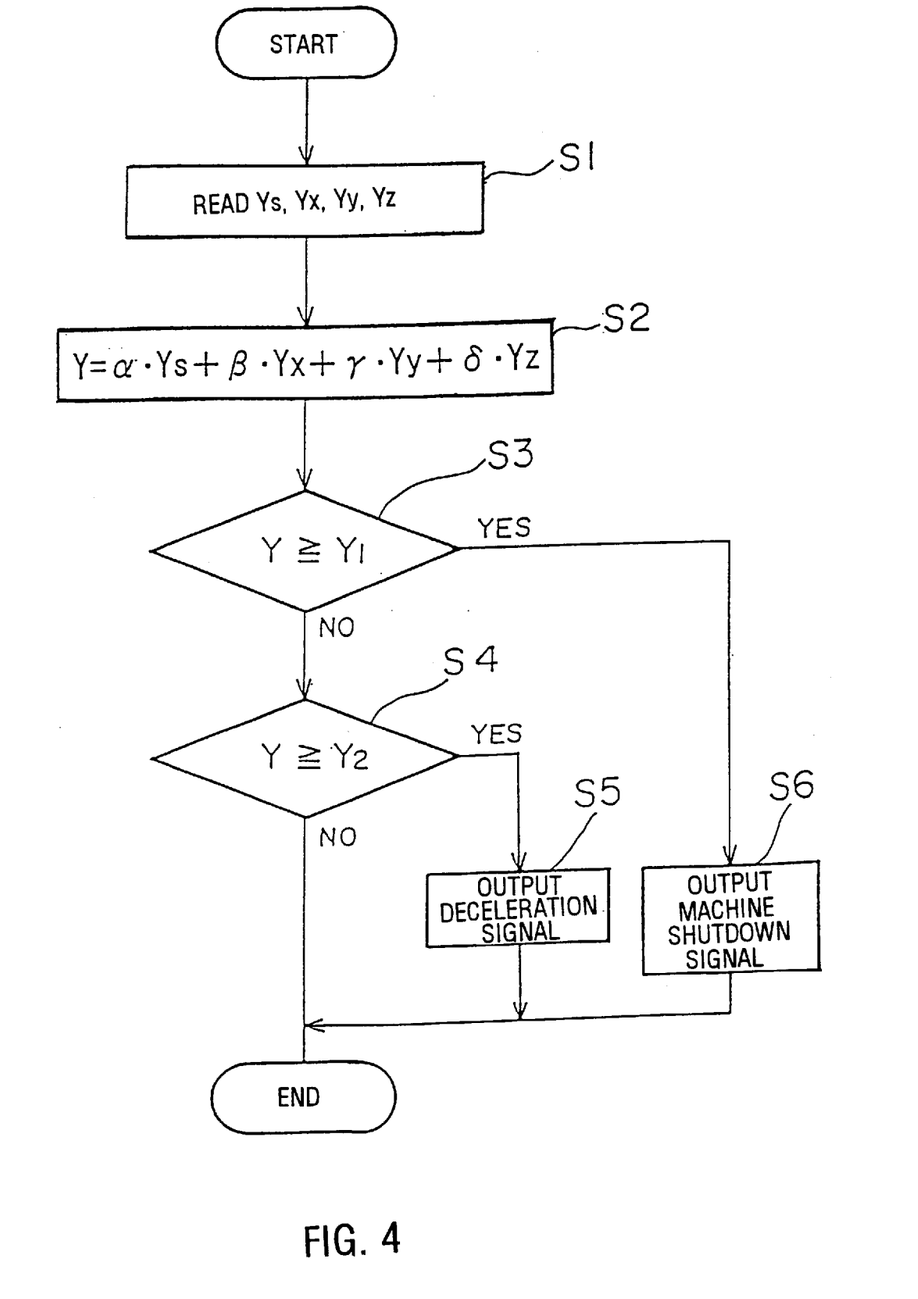
FIG. 4 is a flowchart of a processing sequence, according to a first example, of a programmable machine controller shown in FIG. 2.

FIG. 4 shows a processing sequence, according to a first example, of the programmable machine controller 16. In FIG. 4, numbers following "S" indicate step numbers.

[S1] The programmable machine controller 16 reads estimated disturbant load torques Ys, Yx, Yy, Yz.

[S2] The programmable machine controller 16 combines the estimated disturbant load torques Ys, Yx, Yy, Yz into a combined torque Y according to the equation (1), for example, referred to above.

[S3] The programmable machine controller 16 decides whether or not the combined torque Y is equal to or greater than a predetermined reference torque $Y_1$. If the combined torque Y is equal to or greater than the reference torque $Y_1$, then control goes to a step S6. If not, then control proceeds to a step S4. The reference torque $Y_1$ serves as a cutter fracture detecting level for detecting shocks that are produced when the cutter is fractured, and is variably established based on various factors including the type of the cutter and the hardness of the material of a workpiece machined by the cutter.

[S4] The programmable machine controller 16 decides whether or not the combined torque Y, which is smaller than the reference torque $Y_1$, is equal to or greater than a predetermined reference torque $Y_2$. The reference torque $Y_2$ serves as an abnormal load detecting level determined depending on the type of the cutter, the hardness of the material of a workpiece machined by the cutter, the wear of the cutter, the amount of a coolant, and chips, and is variably established based on these factors. If the combined torque Y equal to or greater than the reference torque $Y_2$, then control goes to a step S5. If not, then the programmable machine controller 16 decides on a normal condition, and puts an end to the processing sequence.

[S5] Since the combined torque Y is smaller than the reference torque $Y_1$ and equal to or greater than the reference torque $Y_2$, the programmable machine controller 16 outputs a deceleration signal to decelerate the servomotor 63 for the Z-axis. Alternatively, the programmable machine controller 16 issues a tool change command.

[S6] Since the combined torque Y is equal to or greater than the reference torque $Y_1$, the programmable machine controller 16 decides that shocks are produced due to a tool fracture, and outputs a machine shutdown signal to stop the machine tool and displays an alarm. To stop the machine tool, when the tool fracture is detected, the programmable machine controller 16 causes the machine tool to stop the machining process, and return the Z-axis to its origin at a fast feed speed of 25%.

In this example, disturbant load torques imposed on the servomotors 61, 62, 63 and the spindle motor 73 are estimated using the observers 410, 420, 430, 710 for detecting a cutter fracture. Accordingly, a cutter fracture can easily be detected without additional external sensors. Inasmuch as no accelerating and decelerating loads are contained in the estimated disturbant load torques, and hence loads imposed on the spindle and the various axes, i.e., all loads imposed on the cutter, can accurately be estimated, abnormal conditions, which cannot be detected with only the spindle and the Z-axis, can be detected highly accurately.

Figure 5:
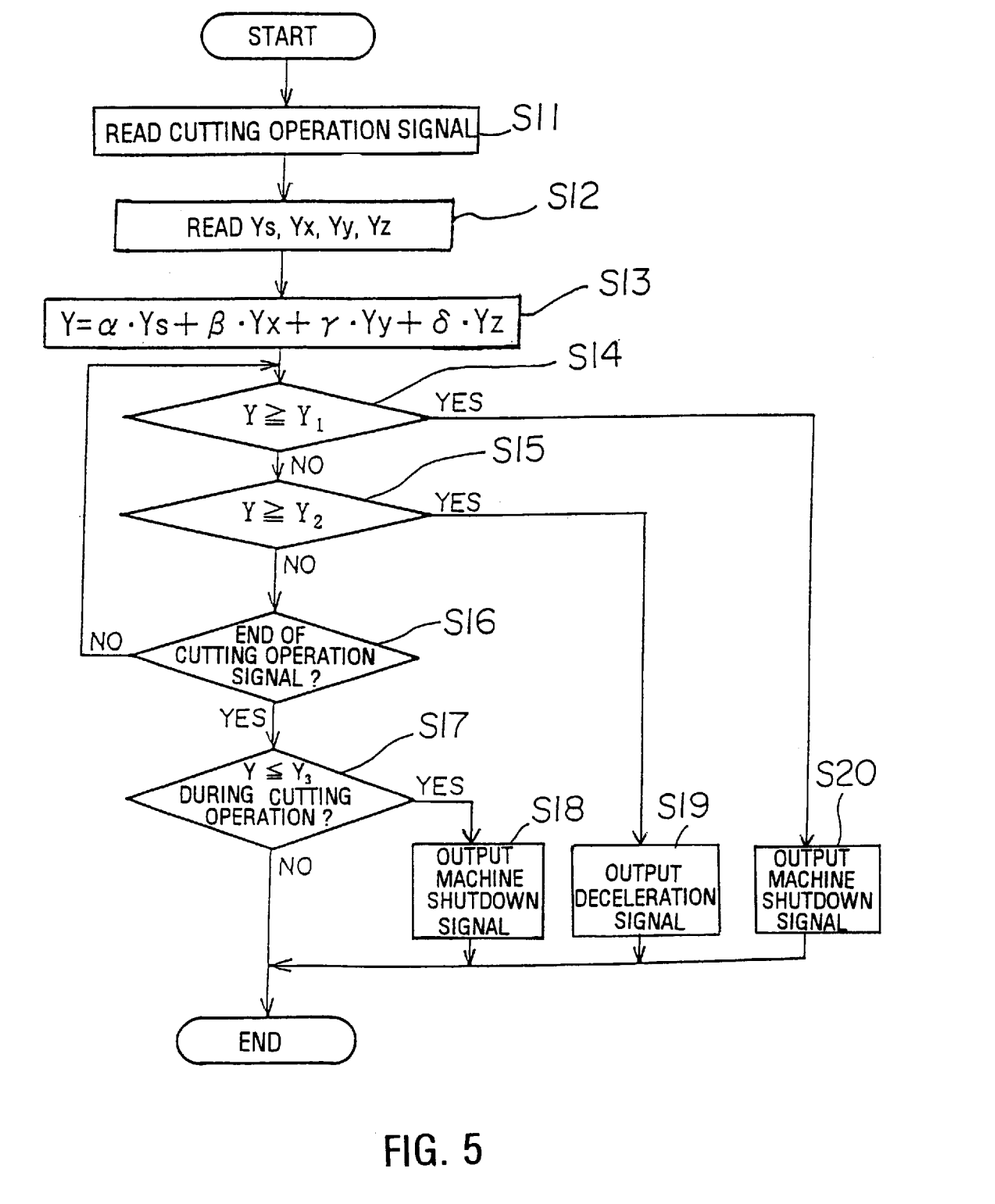
FIG. 5 is a flowchart of a processing sequence, according to a second example, of the programmable machine controller.

FIG. 5 shows a processing sequence, according to a second example, of the programmable machine controller 16. In FIG. 5, numbers following "S" indicate step numbers.

[S11] The programmable machine controller 16 reads a cutting operation signal. Specifically, the programmable machine controller 16 decides that the machine tool is in a cutting operation when the processor reads a G code, for example, in the machining program.

[S12] The programmable machine controller 16 reads estimated disturbant load torques Ys, Yx, Yy, Yz.

[S13] The programmable machine controller 16 combines the estimated disturbant load torques Ys, Yx, Yy, Yz into a combined torque Y according to the equation (1), for example, referred to above.

[S14] The programmable machine controller 16 decides whether or not the combined torque Y is equal to or greater than a predetermined reference torque $Y_1$. If the combined torque Y is equal to or greater than the reference torque $Y_1$, then control goes to a step S20. If not, then control proceeds to a step S15. The reference torque $Y_1$ serves as a cutter fracture detecting level for detecting a cutter fracture, and is variably established based on various factors including the type of the cutter and the hardness of the material of a workpiece machined by the cutter.

[S15] The programmable machine controller 16 decides whether or not the combined torque Y, which is smaller than the reference torque $Y_1$, is equal to or greater than a predetermined reference torque $Y_2$. The reference torque $Y_2$ serves as an abnormal load detecting level determined depending on the type of the cutter, the hardness of the material of a workpiece machined by the cutter, the wear of the cutter, the amount of a coolant, and chips, and is variably established based on these factors. If the combined torque Y equal to or greater than the reference torque $Y_2$, then control goes to a step S19. If not, then control proceeds to a step S16.

[S16] The programmable machine controller 16 decides whether a cutting operation signal is ended or not. If ended, then control goes to a step S17. If not, then control goes back to the step S14.

[S17] Upon the ending of the cutting operation, the programmable machine controller 16 decides whether or not the combined torque Y is equal to or smaller than a predetermined reference torque $Y_3$ during the cutting operation. The reference torque $Y_3$ is set to a small level. If the combined torque Y is equal to or smaller than the reference torque $Y_3$, then control goes to a step S18. If not, then the programmable machine controller 16 decides on a normal condition, and puts an end to the processing sequence.

[S18] Since the combined torque Y is abnormally low or nil, the programmable machine controller 16 decides that a failure such as a cutter fracture occurs, and outputs a machine shutdown signal to stop the machine tool and displays an alarm. This is a case that shocks due to a tool fracture have not appeared in any disturbant load torque. To stop the machine tool, when the tool fracture is detected, the programmable machine controller 16 causes the machine tool to stop the machining process, and return the Z-axis to its origin at a fast feed speed of 25%.

[S19] Since the combined torque Y is smaller than the reference torque $Y_1$ and equal to or greater than the reference torque $Y_2$, the programmable machine controller 16 outputs a deceleration signal to decelerate the servomotor 63 for the Z-axis. Alternatively, the programmable machine controller 16 issues a tool change command.

[S20] Since the combined torque Y is equal to or greater than the reference torque $Y_1$, the programmable machine controller 16 decides that shocks are produced due to a tool fracture, and outputs a machine shutdown signal to stop the machine tool and displays an alarm. To stop the machine tool, when the tool fracture is detected, the programmable machine controller 16 causes the machine tool to stop the machining process, and return the Z-axis to its origin at a fast feed speed of 25%.

In this example, disturbant load torques imposed on the servomotors 61, 62, 63 and the spindle motor 73 are estimated using the observers 410, 420, 430, 710 for detecting a cutter fracture when the combined torque is abnormally high or abnormally low. Accordingly, a cutter fracture can easily be detected without additional external sensors. Inasmuch as no accelerating and decelerating loads are contained in the estimated disturbant load torques, and hence loads imposed on the spindle and the various axes, i.e., all loads imposed on the cutter, can accurately be estimated, abnormal conditions, which cannot be detected with only the spindle and the Z-axis, can be detected highly accurately.

In the above description, the estimated disturbant load torques and the reference torques are compared, and the deceleration and shutdown commands, etc. are issued by the programmable machine controller 16. However, the estimated disturbant load torques and the reference torques may be compared, and the deceleration and shutdown commands, etc. may be issued by the processor 11.

Figure 6:
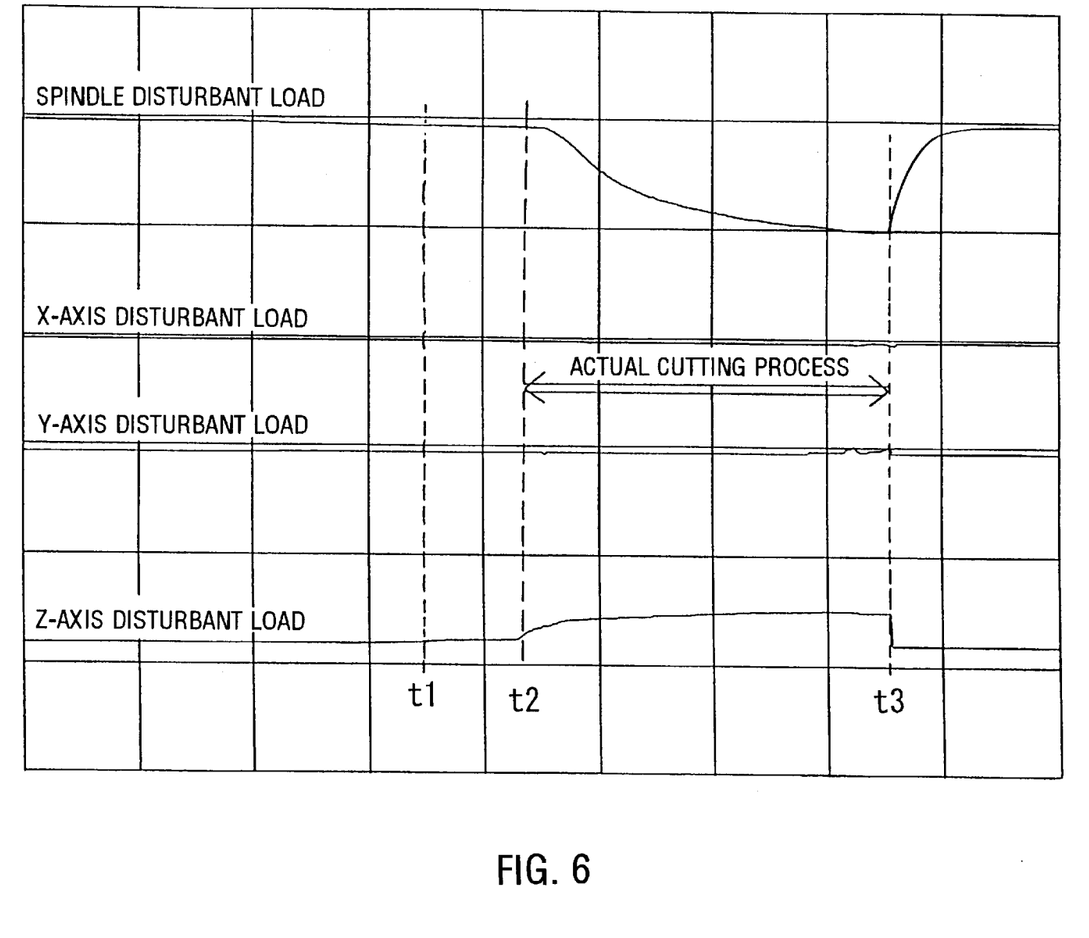
FIG. 6 is a diagram showing how disturbant loads on a spindle and axes vary when a drill cuts a workpiece under normal conditions.

FIG. 6 shows how disturbant loads on the spindle and the axes vary when a drill cuts a workpiece under normal conditions. In the example shown in FIG. 6, the drill comprises a carbide drill having a diameter of 5.5 mm, and drills a hole having a depth of 16.5 mm in a workpiece of A5052P at a spindle rotational speed of 200 rpm and a feed speed of 290 mm/min. in the presence of a water-soluble coolant.

The Z-axis starts being lowered from a time t1, and the drill reaches the workpiece, starting to cut the workpiece at a time t2. When the cutting operation is finished at a time t3, the Z-axis is stopped and returned to its origin. The spindle starts to stop its rotation at the time t3. During an actual cutting process, i.e., from the time t2 to the time t3, the disturbant loads on the X- and Y-axes, which are still axes, suffer no special noticeable changes.

In FIG. 6, the disturbant load on the spindle varies more greatly as the spindle is lowered, and becomes maximum at the time t3 when the cutting operation is finished, i.e., at the bottom of the drilled hole. The measurement ranges for the spindle and the axes differ from each other for the ease with which FIG. 6 can be recognized.

Figure 7:
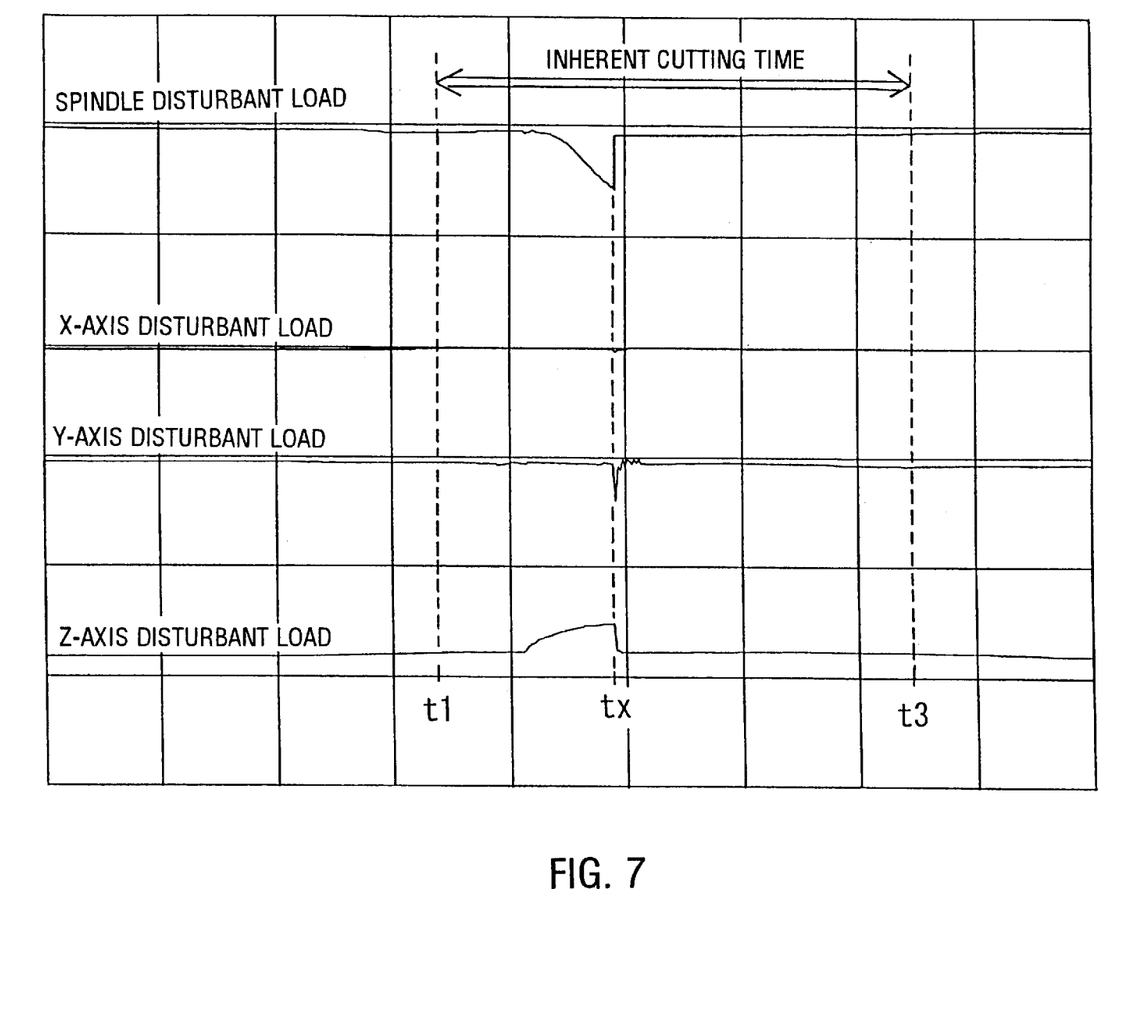
FIG. 7 is a diagram showing how disturbant loads on the spindle and axes vary when the drill is fractured.

FIG. 7 shows how disturbant loads on the spindle and axes vary when the drill is fractured. In FIG. 7, the drill is fractured at a time tx when the workpiece is machined under the same conditions as those in FIG. 6. It is to be noted that the cutter fracture takes place when the disturbant load on the spindle varies is smaller than the disturbant load on the spindle when the workpiece is machined under normal conditions. This means that the cutter fracture cannot be detected simply by monitoring the disturbant load on the spindle. However, since a still axis, i.e., the Y-axis in this case, suffers a large disturbant load at this time, the cutter fracture can be detected by detecting the large disturbant load on the Y-axis.

The cutter has a large tendency to fracture regardless of small disturbant loads on the spindle especially if the cutter is hard but low in malleability and hence brittle, as is the case with a carbide cutter. It is considered that shocks produced upon a cutter fracture are reflected on an axis with respect to which the workpiece and the cutter do not move relatively to each other.

A cutter fracture can also be detected in other machining processes than the drilling process which involve an axis with respect to which the workpiece and the cutter do not move relatively to each other and also a still axis. Specific examples of the detection of such cutter fractures will be described below.

Figure 8:
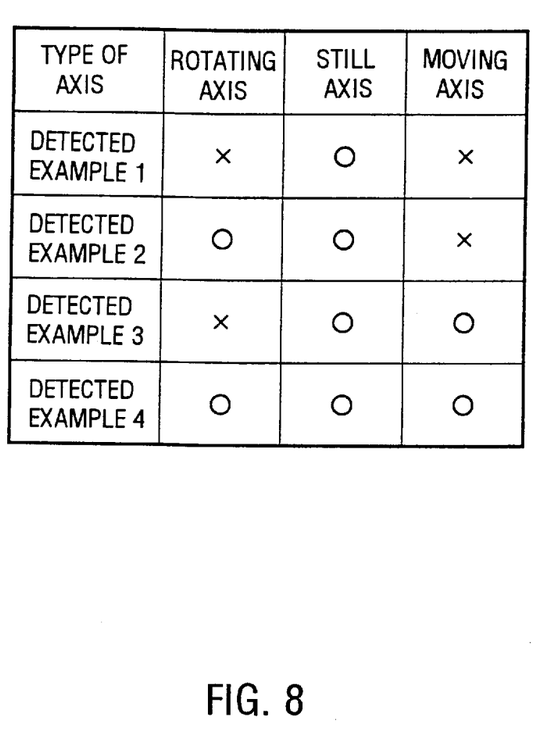
FIG. 8 is a diagram showing patterns of the spindle and axes with respect to which a cutter fracture is detected.

FIG. 8 shows patterns of the spindle and axes with respect to which a cutter fracture is detected. In FIG. 8, the symbol "○" represents an axis with respect to which a cutter fracture has been detected, and the symbol "x" represents an axis with respect to which a cutter fracture has not been detected. A review of FIG. 8 reveals that a disturbant load due to a cutter fracture may appear on only a still spindle or axis, on a rotating spindle or axis or a still spindle or axis, and on all rotating spindle or axes.

Figure 9:
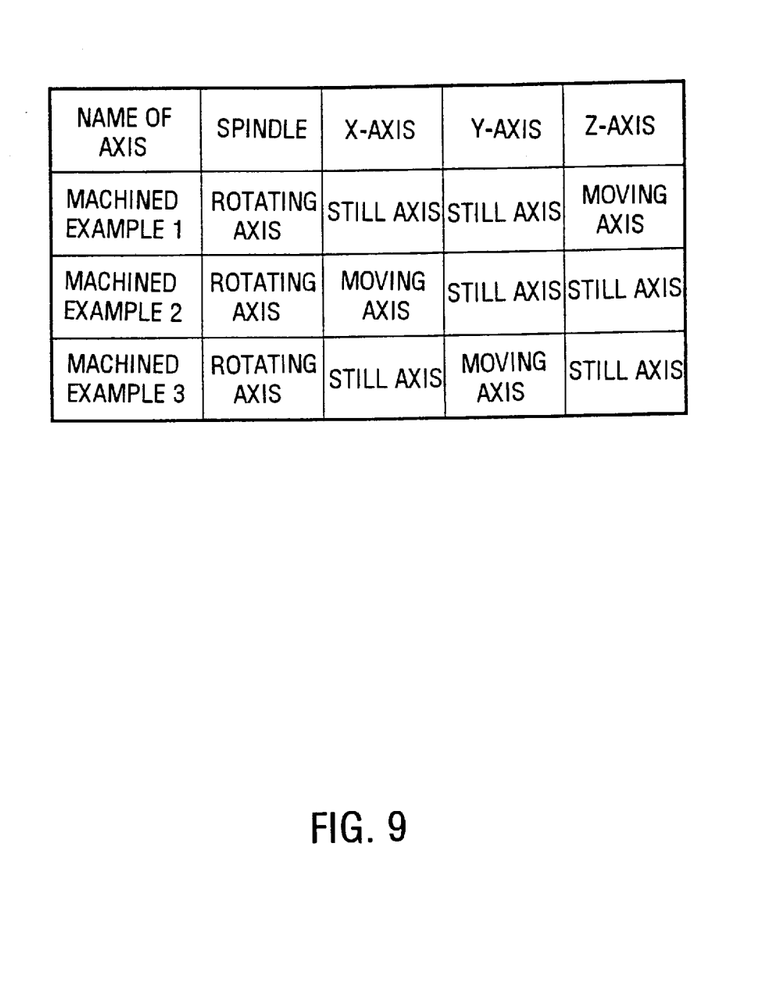
FIG. 9 is a diagram showing classifications of the spindle and axes for drilling, tapping, reaming, and boring processes.

FIG. 9 shows classifications of the spindle and axes for drilling, tapping, reaming, and boring processes. As shown in FIG. 9, in the drilling, tapping, reaming, and boring processes, the spindle can be a rotating axis, but each of the X-, Y-, and Z-axes can be a moving axis or a still axis. Depending on the machining process, specifically, one of the X-, Y-, and Z-axes can be a moving axis whereas the other two axes can be a still axis.

Figure 10:
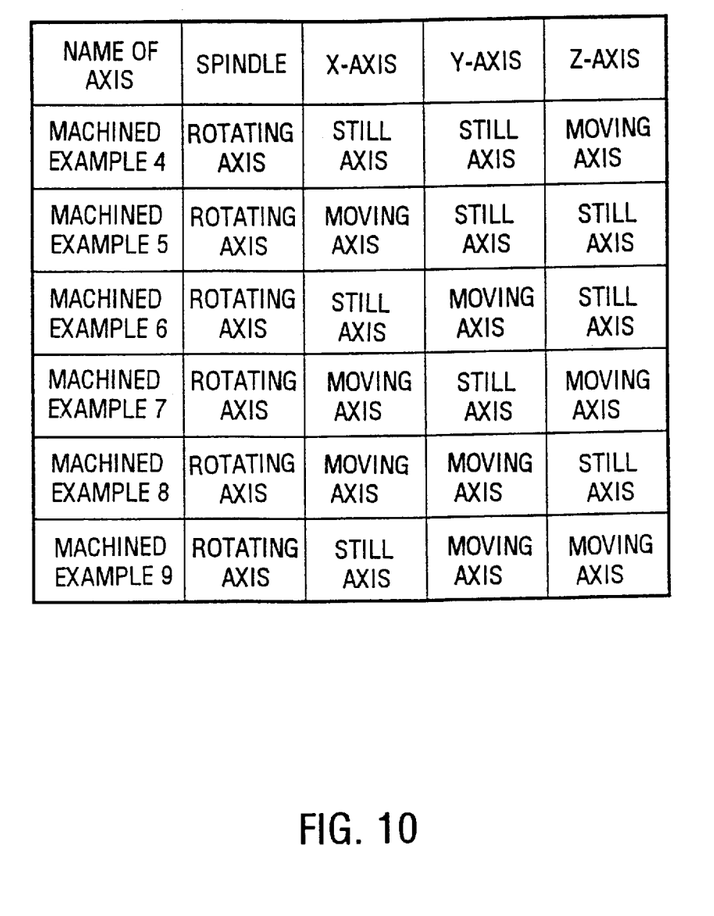
FIG. 10 is a diagram showing classifications of the spindle and axes for milling and end-milling processes.

FIG. 10 shows classifications of the spindle and axes for milling and end-milling processes. As shown in FIG. 10, in the milling and end-milling processes, the spindle can be a rotating axis, but each of the X-, Y-, and Z-axes can be a moving axis or a still axis. Depending on the machining process, specifically, one of the X-, Y-, and Z-axes can be a moving axis whereas the other two axes can be a still axis, or one of the X-, Y-, and Z-axes can be a still axis whereas the other two axes can be a moving axis.

Figure 11:
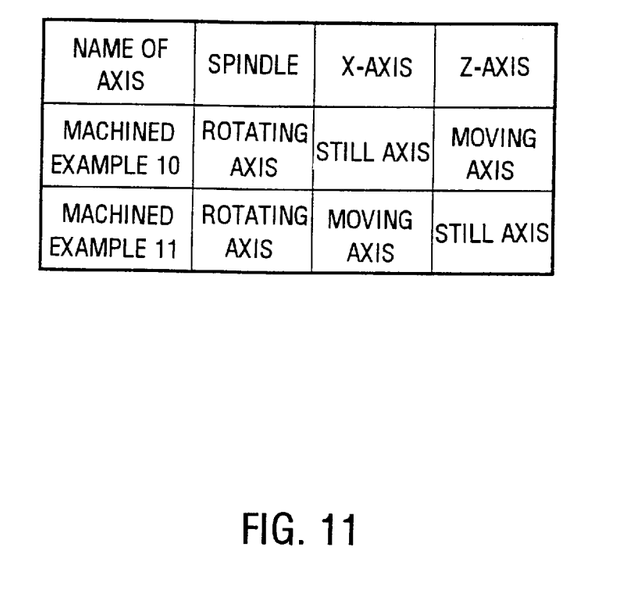
FIG. 11 is a diagram showing classifications of the spindle and axes for a cutting process.

FIG. 11 shows classifications of the spindle and axes for a cutting process. As shown in FIG. 11, in the cutting process, the spindle can be a rotating axis, but each of the X-, Y-, and Z-axes can be a moving axis or a still axis.

According to the present invention, as described above, disturbant load torques acting on an operating axis and a still axis with respect to which a workpiece and a cutter do not move relatively to each other are estimated with observers, and a cutter fracture is decided based on the estimated disturbant load torques. Therefore, it is possible to detect all patterns of cutter fractures which would otherwise not be detected with only the operating axis, so that cutter fractures can be detected with high reliability.

Because patterns of cutter wear and cutter fractures can be controlled in a wide range, the detection of cutter fractures is made reliable enough to prevent jig dislocations which would otherwise be caused by shocks produced due to a machining process being continued regardless of a cutter fracture, or to prevent the production of defective parts in large quantities.

We claim:

1. A cutter fracture detecting system for a numerically controlled machine tool in which a workpiece and a cutter move relatively to each other, the cutter fracture detecting system comprising:

still axis disturbant load torque estimating means for estimating a disturbant load torque acting on at least one axis on which the workpiece and the cutter do not move relatively to each other;

comparing means for comparing the disturbant load torque estimated by said still axis disturbant load torque estimating means with a predetermined reference torque; and machine shutdown command means for outputting a command signal to stop the numerically controlled machine tool depending on a result of the comparison performed by said comparing means.

2. A cutter fracture detecting system comprising:

still axis disturbant load torque estimating means for estimating a disturbant load torque acting on at least one axis on which the workpiece and the cutter do not move relatively to each other:

rotating axis disturbant load torque estimating means for estimating a disturbant load torque acting on a spindle which rotates the cutter;

moving axis disturbant load torque estimating means for estimating a disturbant load torque acting on at least one feed axis which controls relative movement of the workpiece and the cutter;

comparative decision means for comparing a combined torque produced by combining disturbant load torques estimated by said still axis disturbant load torque estimating means, said rotating axis disturbant load torque estimating means and said moving axis disturbant load torque estimating means with a predetermined reference torque, and determining that said cutter is fractured when said combined torque exceeds said reference torque; and machine shutdown command means for outputting a command signal to stop the numerically controlled machine tool depending on a result of the comparison performed by said comparative decision means.

3. A cutter fracture detecting system according to claim 1, wherein said at least one axis on which the workpiece and the cutter do not move relatively to each other comprise the X- and Y-axes.

4. A cutter fracture detecting system according to claim 1, wherein there are a plurality of axes on which the workpiece and the cutter do not move relatively to each other, and said comparing means comprises comparative decision means for comparing a combined torque produced by combining disturbant load torques estimated by a plurality of said still axis disturbant load torque estimating means with the reference torque, and determining that the cutter is fractured when the combined torque exceeds the reference torque.

5. A cutter fracture detecting system according to claim 2, wherein said combined torque is expressed by:

$$Y = \alpha \cdot Yz + \beta \cdot Ys + \gamma \cdot Yx + \delta \cdot Yy$$

where Y is the combined torque, Ys is the disturbant load torque estimated by said rotating axis disturbant load torque estimating means, Yz is the disturbant load torque estimated by said moving axis disturbant load torque estimating means, Yx and Yy are the disturbant load torques estimated by said still axis disturbant load torque estimating means, and $\alpha$, $\beta$, $\gamma$, $\delta$ are coefficients.

6. A cutter fracture detecting system according to claim 2, wherein said combined torque is expressed by:

$$Y = \alpha \cdot Yz + \beta \cdot Ys + \eta(\gamma \cdot Yx^2 + \delta \cdot Yy^2)^{1/2}$$

where Y is the combined torque, Ys is the disturbant load torque estimated by said rotating axis disturbant load torque estimating means, Yz is the disturbant load torque estimated by said moving axis disturbant load torque estimating means, Yx and Yy are the disturbant load torques estimated by said still axis disturbant load torque estimating means, and $\alpha$, $\beta$, $\gamma$, $\delta$, $\eta$ are coefficients.

7. A cutter fracture detecting system according to claim 1, further comprising:

rotating axis disturbant load torque estimating means for estimating a disturbant load torque acting on a spindle which rotates the cutter;

moving axis disturbant load torque estimating means for estimating a disturbant load torque acting on at least one feed axis which controls relative movement of the workpiece and cutter; and wherein said comparing means comprises comparative decision means for comparing the disturbant load torques estimated by said still axis disturbant load torque estimating means, said rotating axis disturbant load torque estimating means, and said moving axis disturbant load torque estimating means with respective predetermined reference torques, and determining that said cutter is fractured when the disturbant load torque estimated by said rotating axis disturbant load torque estimating means is smaller than the corresponding reference torque, and when either of the disturbant load torques estimated by said moving axis disturbant load torque estimating means and said still axis disturbant load torque estimating means exceeds the corresponding reference torque.

8. A cutter fracture detecting system according to claim 1, further comprising:

rotating axis disturbant load torque estimating means for estimating a disturbant load torque acting on a spindle which rotates the cutter;

moving axis disturbant load torque estimating means for estimating a disturbant load torque acting on at least one feed axis which controls relative movement of the workpiece and cutter; and wherein said comparing means comprises first comparative decision means for comparing a first combined torque produced by combining the disturbant load torques estimated by said rotating axis disturbant load torque estimating means and said moving axis disturbant load torque with a first reference torque, and determining that said cutter is fractured when said first combined torque exceeds said first reference torque, and second comparative decision means for comparing a second combined torque produced by combining the disturbant load torques estimated by said still axis disturbant load torque estimating means with a second reference torque, and determining that said cutter is fractured when said second combined torque exceeds said second reference torque.

9. A cutter fracture detecting system according to claim 1, further comprising:

rotating axis disturbant load torque estimating means for estimating a disturbant load torque acting on a spindle which rotates the cutter;

moving axis disturbant load torque estimating means for estimating a disturbant load torque acting on at least one feed axis which controls relative movement of the workpiece and cutter; and wherein said comparing means comprises first comparative decision means for comparing the disturbant load torque estimated by said rotating axis disturbant load torque estimating means with a first reference torque, and determining that said cutter is fractured when said disturbant load torque exceeds said first reference torque, and second comparative decision means for comparing a combined torque produced by combining at least two of the disturbant load torques estimated by said moving axis disturbant load torque estimating means and said still axis disturbant load torque estimating means with a second reference torque, and determining that said cutter is fractured when said combined torque exceeds said second reference torque.

* * * * *